US010015235B2

(12) United States Patent
Bertz et al.

(10) Patent No.: US 10,015,235 B2
(45) Date of Patent: Jul. 3, 2018

(54) DISTRIBUTION OF MEDIA CONTENT TO WIRELESS COMMUNICATION DEVICES

(71) Applicant: Sprint Communications Company L.P., Overland Park, KS (US)

(72) Inventors: Lyle T. Bertz, Lee's Summit, MO (US); Charles Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 168 days.

(21) Appl. No.: 14/522,139

(22) Filed: Oct. 23, 2014

(65) Prior Publication Data

US 2016/0119408 A1    Apr. 28, 2016

(51) Int. Cl.
| | |
|---|---|
| H04L 29/08 | (2006.01) |
| H04L 12/18 | (2006.01) |
| H04L 29/06 | (2006.01) |
| H04W 4/06 | (2009.01) |

(52) U.S. Cl.
CPC ............ *H04L 67/10* (2013.01); *H04L 12/189* (2013.01); *H04L 65/4076* (2013.01); *H04L 65/4084* (2013.01); *H04L 67/2814* (2013.01); *H04L 67/42* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 6,822,957 B1 | 11/2004 | Schuster et al. | |
| 7,724,688 B2 | 5/2010 | Yamada et al. | |
| 8,010,626 B2 | 8/2011 | Yue et al. | |
| 8,112,531 B2 | 2/2012 | Walsh et al. | |
| 8,140,701 B2 | 3/2012 | Rajan | |
| 8,509,241 B2 | 8/2013 | Li et al. | |

(Continued)

FOREIGN PATENT DOCUMENTS

| | | |
|---|---|---|
| CN | 101674288 | 3/2010 |
| EP | 2012501 | 1/2009 |

(Continued)

OTHER PUBLICATIONS

"Project Proposal—Mobile Content Delivery Optimization;" TG1 Tollgate Approval Sheet; Jan. 17, 2013; pp. 1-12; Version 0.71; NGMN Alliance; Frankfurt, Germany.

*Primary Examiner* — Kevin Bates
*Assistant Examiner* — Lesa Kennedy

(57) ABSTRACT

A data processing system facilitates content-delivery to a wireless communication device over a plurality of Content Delivery Networks (CDNs). The data system receives Internet Protocol (IP) address data sets characterizing IP access to the wireless communication device through one or more IP access networks. The data system receives one or more CDN identifiers indicating active ones of the CDNs for the wireless communication device on the IP access networks. The data system processes the IP address data sets and the CDN identifiers to identify a network address for one of the CDNs and a content-delivery interface from the one CDN to the wireless communication device. The data system transfers network data indicating the wireless communication device, the network address to the one CDN, and the content-delivery interface.

14 Claims, 7 Drawing Sheets

(56) References Cited

U.S. PATENT DOCUMENTS

| | | |
|---|---|---|
| 8,516,529 B2 | 8/2013 | Lajoie et al. |
| 8,576,846 B2 | 11/2013 | Kumar et al. |
| 8,665,873 B2 | 3/2014 | Sarikaya et al. |
| 8,700,728 B2 | 4/2014 | Luna et al. |
| 8,719,876 B2 | 5/2014 | Kotecha et al. |
| 8,761,056 B2 | 6/2014 | Hyun et al. |
| 8,799,480 B2 | 8/2014 | Kovvali et al. |
| 8,909,736 B1* | 12/2014 | Bosch ............... H04L 67/1093 709/217 |
| 2003/0037139 A1 | 2/2003 | Shteyn |
| 2009/0178091 A1 | 7/2009 | Miyamoto et al. |
| 2010/0130122 A1 | 5/2010 | Sridhar et al. |
| 2012/0005372 A1 | 1/2012 | Sarikaya et al. |
| 2012/0184258 A1 | 7/2012 | Kovvali et al. |
| 2012/0226770 A1 | 9/2012 | Schapira et al. |
| 2012/0239785 A1 | 9/2012 | Pazos |
| 2012/0246273 A1 | 9/2012 | Bornstein et al. |
| 2012/0259994 A1* | 10/2012 | Gillies ............... H04L 12/1881 709/231 |
| 2012/0281621 A1* | 11/2012 | Lotfallah ............. H04L 12/145 370/328 |
| 2013/0094445 A1* | 4/2013 | De Foy ............... H04L 45/021 370/328 |
| 2013/0227284 A1 | 8/2013 | Pfeffer et al. |
| 2013/0246631 A1* | 9/2013 | Gonzales ............ H04N 21/6405 709/227 |
| 2014/0052824 A1 | 2/2014 | Fall |
| 2014/0179301 A1 | 6/2014 | Harris |
| 2014/0192697 A1 | 7/2014 | Anchan et al. |
| 2014/0281489 A1* | 9/2014 | Peterka .............. H04L 63/0464 713/153 |
| 2015/0026352 A1* | 1/2015 | De Foy ............... H04L 67/16 709/228 |
| 2016/0192036 A1* | 6/2016 | Yamagishi ......... H04N 21/6405 725/109 |

FOREIGN PATENT DOCUMENTS

| | | |
|---|---|---|
| EP | 2716011 | 12/2012 |
| WO | 2012167106 | 12/2012 |
| WO | 2013056058 | 4/2013 |
| WO | 2013113181 | 8/2013 |
| WO | 2013120356 | 8/2013 |
| WO | 2013134211 | 9/2013 |
| WO | 2014124692 | 8/2014 |

* cited by examiner

DISTRIBUTION OF MEDIA CONTENT TO WIRELESS COMMUNICATION DEVICES

TECHNICAL BACKGROUND

Content Delivery Networks (CDNs) host media content like movies, music, and the like. For many media content transfers, two CDNs are used: an upstream CDN (uCDN) and a downstream CDN (dCDN). The uCDN collects media content and/or associated content metadata from various content sources. The uCDN selects dCDNs to deliver the media content to user devices. The dCDN selection is often based on the proximity and transport efficiency of the selected dCDN to a given user device. The interactions between the uCDN and the dCDN are carried out over CDN Interface (CDNI) signaling. The CDNI signaling indicates control, footprint, request routing, metadata, and logging information.

Internet Protocol (IP) access networks are often used as dCDNs due to their proximity to the user devices. Exemplary IP access networks include wireless communication networks, cable television networks, fiber optic data networks, Ethernet access systems, and satellite communication systems. The IP access networks allocate and translate IP addresses for their user devices to facilitate these IP communications.

Wireless communication networks, such as Long Term Evolution (LTE) systems, often have associated equipment at the user location. For example, many users have wireless femtocells and Local IP Access (LIPA) systems that are coupled to the Internet and enhance wireless coverage in their home, business, school, or the like. These femtocells and LIPA systems also allocate and translate IP addresses for their user devices to facilitate IP communications.

In addition to wireless network equipment, many users also deploy Local Area Networks (LANs) to transfer IP communications over protocols like Wireless Fidelity (Wifi) and Ethernet. The LANs may be coupled to various media servers that store media content. For example, a Universal Plug and Play (uPnP) server may provide video content to a user television in IP communications over the LAN.

Unfortunately, the content of CDNI signaling and the level CDN interaction is not effective in this environment. The use of CDNs at the user site in coordination with wireless network CDNs, landline ISP CDNs, and core Internet CDNs is not efficient or robust enough to properly distribute media content to wireless user communication devices.

TECHNICAL OVERVIEW

A data processing system facilitates content-delivery to a wireless communication device over a plurality of Content Delivery Networks (CDNs). The data system receives Internet Protocol (IP) address data sets characterizing IP access to the wireless communication device through one or more IP access networks. The data system receives one or more CDN identifiers indicating active ones of the CDNs for the wireless communication device on the IP access networks. The data system processes the IP address data sets and the CDN identifiers to identify a network address for one of the CDNs and a content-delivery interface from the one CDN to the wireless communication device. The data system transfers network data indicating the wireless communication device, the network address to the one CDN, and the content-delivery interface.

DETAILED DESCRIPTION

Figure 1:
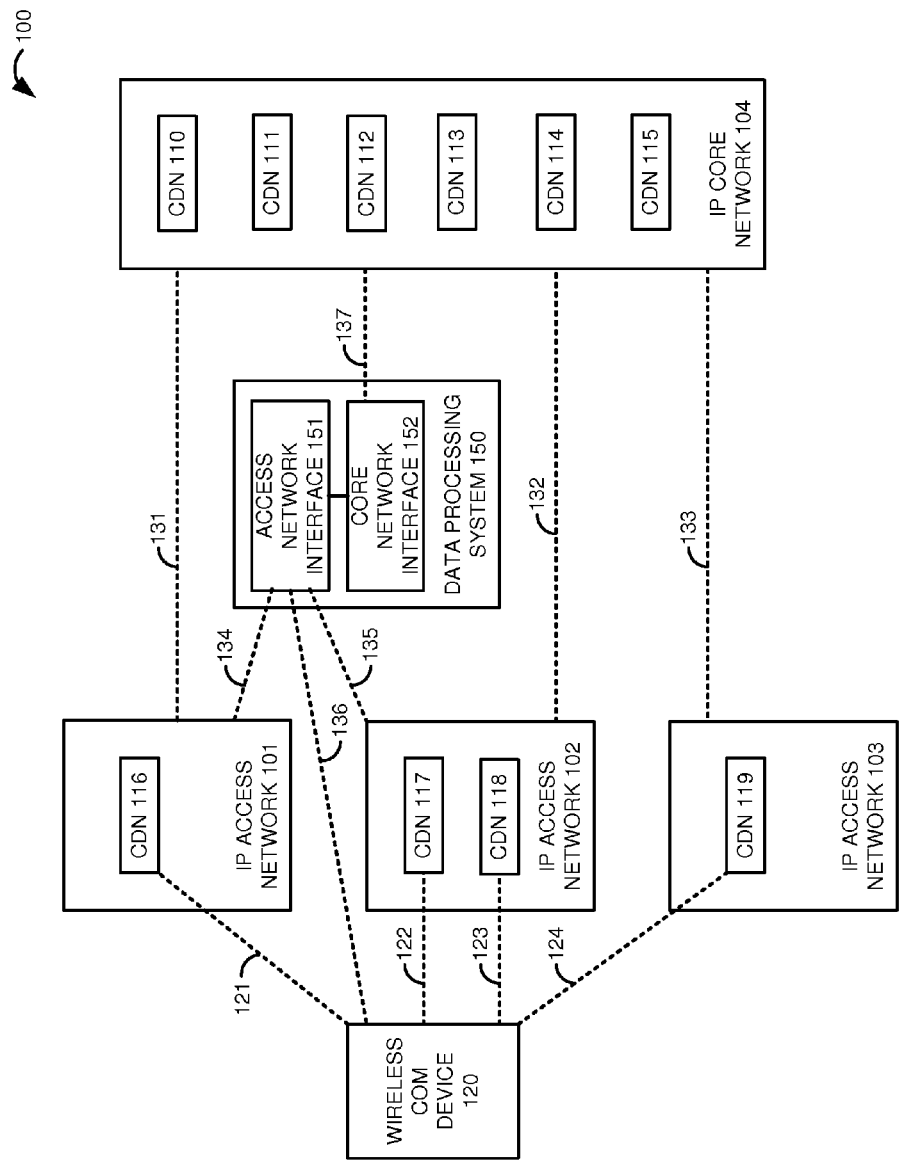
FIGS. 1-3 illustrate a communication system to distribute media content to a wireless communication device.
Figure 2:
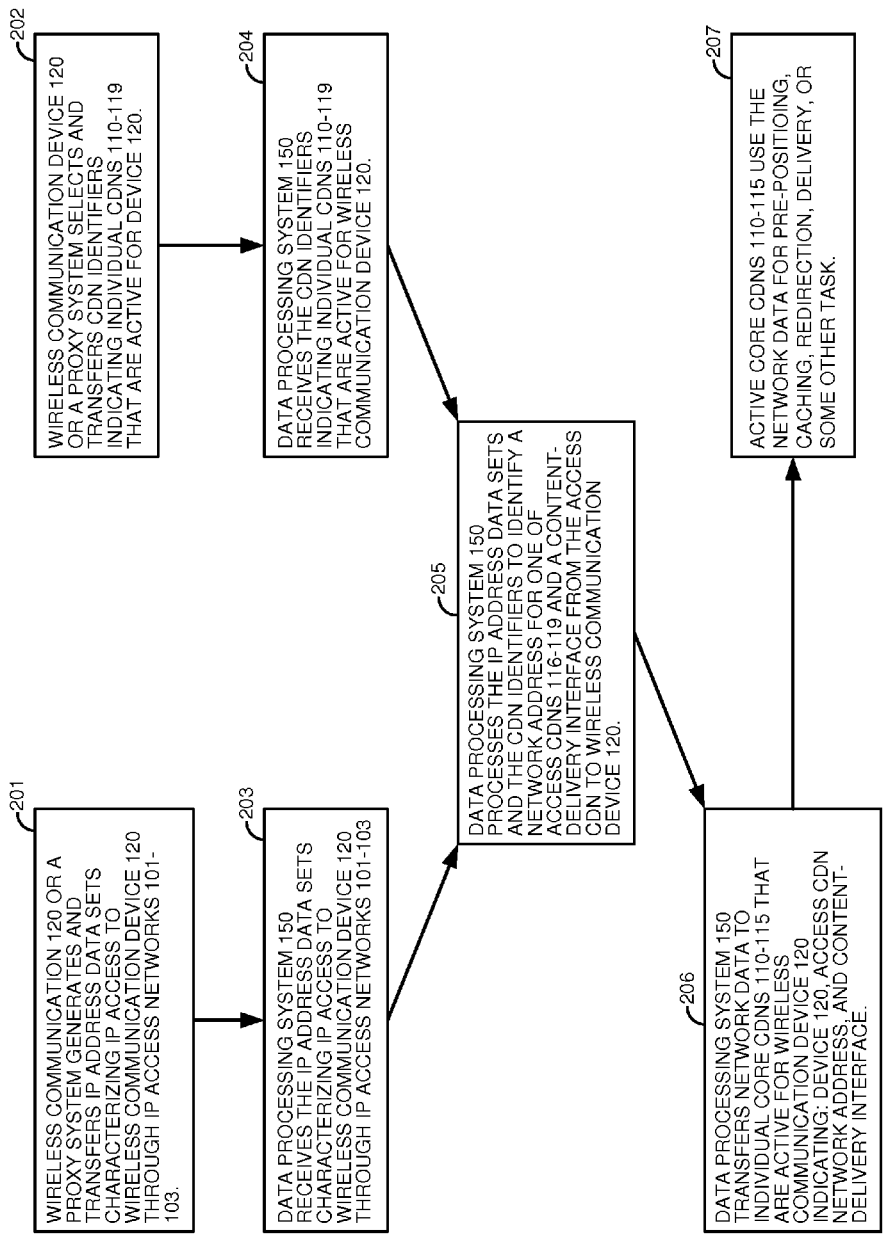
Figure 3:
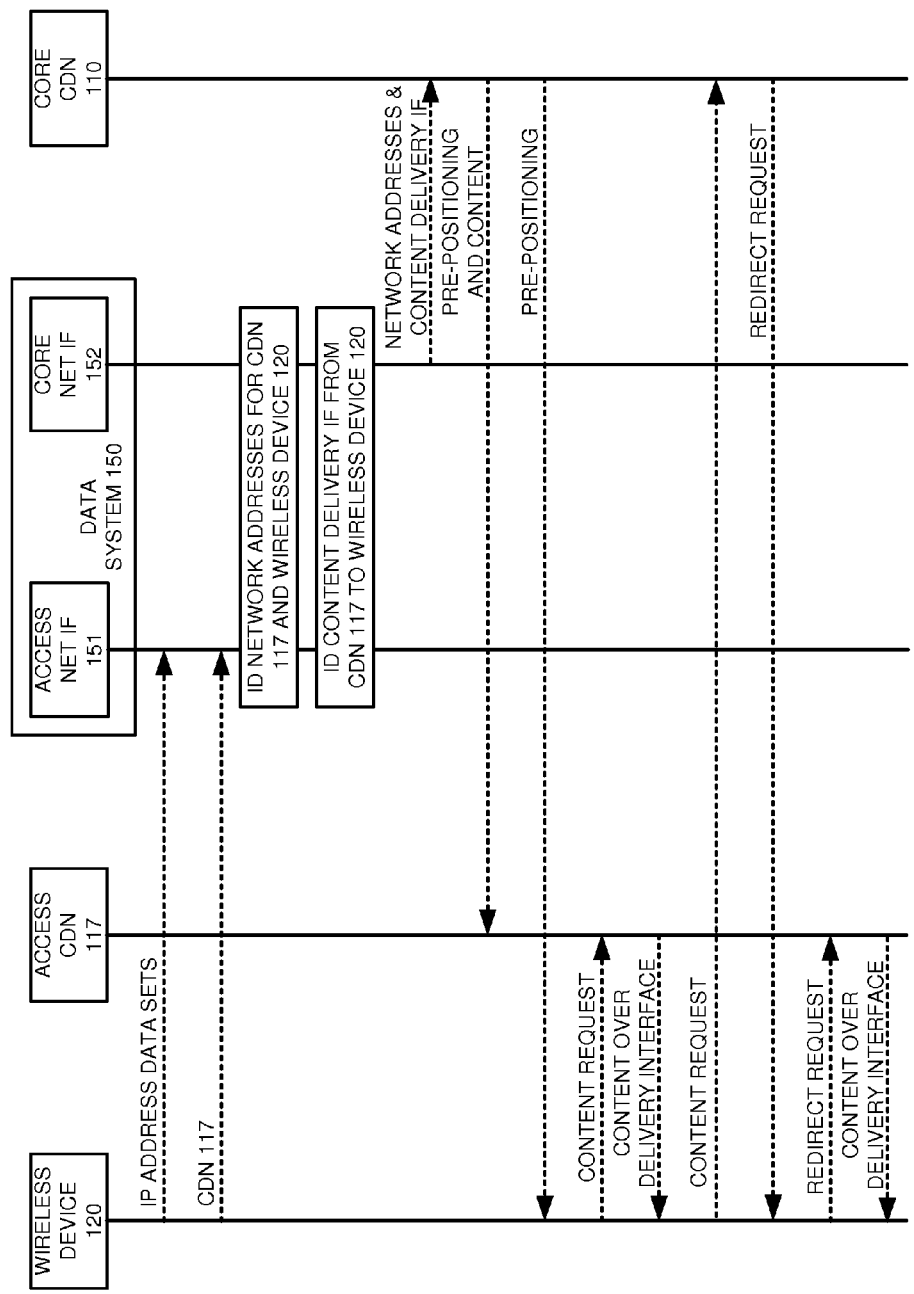

FIGS. 1-3 illustrate communication system 100 to distribute media content to wireless communication device 120. The media content comprises video, audio, graphics, data files, data objects, and/or some other type of data. Referring to FIG. 1, communication system 100 comprises Internet Protocol (IP) access networks 101-103, IP core network 104, wireless communication device 120, and data processing system 150. IP core network 104 exchanges IP data with Content Delivery Networks (CDNs) 110-115. IP access network 101 exchanges IP data with CDN 116. IP access network 102 exchanges IP data with CDNs 117-118. IP access network 103 exchanges IP data with CDN 119. Data processing system 150 comprises access network interface 151 and core network interface 152. Network interfaces 151-152 comprise processing circuitry, bus interfaces, data memory, software, signal processors, network ports, and possibly other computer components.

IP access networks 101-103 may comprise Wide Area Networks (WANs), such as wireless access networks, coaxial/fiber access networks, satellite access systems, and the like. IP access networks 101-103 may also comprise Local Area Networks (LANs) like Long Term Evolution (LTE) Local IP Access (LIPA) systems, LTE femtocell networks, Wireless Fidelity (WiFi) networks, Ethernet systems, universal Plug and Play (uPnP) systems, and the like. IP core network 104 comprises the Internet or some other IP tandem system.

Core CDNs 110-115 comprise CDN Interface (CDNI) transceivers, IP routers, media servers, CDNI controllers, databases, data processors, and/or some other CDN elements. Access CDNs 116-119 comprise IP Interfaces, media hosts, and possibly other CDN elements, such as CDNI controllers, data processors, and databases. Wireless communication device 120 comprises a phone, computer, media player, or some other apparatus having radio communication and data processing components.

Wireless communication device 120 receives media content and possibly other content-delivery information from access CDNs 116-119 over respective content-delivery interfaces 121-124. Content-delivery interfaces 121-124 comprise: Real Time Protocol (RTP), Real Time Streaming Protocol (RTSP), Real Time Control Protocol (RTCP), multipath RTP (mRTP), Long Term Evolution (LTE), enhanced Multimedia Broadcast Multicast Service (eMBMS), LTE Local IP Access (LIPA), File Transfer over Unidirectional Transport (FLUTE), FLUTE over eMBMS, Ethernet, Wireless Fidelity (Wifi), universal Plug and Play (uPnP), or some other data communication system—including combinations thereof.

IP access networks 101-103 and IP core network 104 communicate over respective IP links 131-133. Access network interface 151 and IP access networks 101-102 communicate over respective IP links 134-135. Note that data processing system 150 is not linked to IP access network 103, but receives information about network 103 through wireless communication device 120. Access network interface 151 and wireless communication device 120 communicate over respective IP link 136—and link 136 typically traverses one or more of IP access networks 101-103. Core network interface 152 and IP core network 104 communicate over respective IP link 137. IP links 131-137 may be direct or comprise various intermediate devices, systems, and networks.

In operation, data processing system 150 receives IP address data sets characterizing IP access to wireless communication device 120 through IP access networks 101-103. The IP address data sets may be generated and transferred by wireless communication device 120 or a proxy system that tracks IP address data on behalf of device 120. An exemplary proxy system might be a Packet Data Network Gateway (P-GW), Policy Charging Rules Function (PCRF), or another network processing system. These systems may also transfer other metrics for wireless communication device 120, such as its International Mobile Equipment Identifier (IMEI), International Mobile Subscriber Identifier (IMSI), Global Cell Identifier (GCI), location, and the like. In some examples, wireless communication device 120 or its proxy exchanges messaging with IP access networks 101-103 to discover the IP address allocations, translations, and other metrics used for wireless communication device 120.

Data processing system 150 also receives CDN identifiers indicating individual CDNs 110-119 that are active for wireless communication device 120. The CDN identifiers may be generated and transferred by wireless communication device 120 or a proxy system that tracks active CDNs on behalf of device 120. An exemplary proxy system might be a Broadcast Multicast Service Center (BM-SC), CDN controller, or another data processing system. In some examples, wireless communication device 120 or its proxy exchanges Domain Name System Service (DNS SRV) messaging with a network DNS to identify access CDNs for wireless communication device 120. Wireless communication device 120 may also use a default CDN that is identified by a local gateway or that is configured in wireless communication device 120.

Data processing system 150 processes the IP address data sets and the CDN identifiers to identify network addresses for one or more access CDNs 116-119. Data processing system 150 also processes the IP address data sets and the CDN identifiers to identify the types of content-delivery interfaces 121-124 between the identified CDNs and wireless communication device 120. In some examples, CDN and IP address data transferred by wireless communication device 120 is processed along with network topology data to identify one or more network addresses for the identified CDNs and for wireless communication device 120.

Although wireless communication device 120 may initially identify active access CDNs, data processing system 120 may change the designated access CDN based on various factors. For example, data processing system 120 may grade the active CDNs based on CDNI capabilities, IP access including throughput and redundancy, available content-delivery interfaces, content inventory, user location and mobility, or some other metrics. Data processing system 120 may then select the identified CDNs that grade above a given level for network address identification. Core CDNs 110-115 may also provide access CDN selection thresholds for these metrics to identify the network addresses and the content-delivery interfaces on a per-core CDN basis.

Data processing system 150 may correlate data from multiple sources for wireless communication device 120 to support these operations. For example, data processing system 150 may use the IMSI for wireless communication device 120 to correlate data from eMBMS registrations, device proxies like P-GW and PCRF, the wireless device itself, and other network elements.

Data processing system 150 transfers network data indicating wireless communication device 120, the network address for the access CDNs, and the type of content-delivery interfaces between the access CDNs and wireless communication device 120. Data processing system 150 transfers the network data to individual core CDNs 110-115 that are active for wireless communication device 120. Advantageously, the active core CDNs may use the network data for content pre-positioning, re-direction, and delivery through the access CDNs and content interfaces.

Referring to FIG. 2, the operations of communication system 100 are described. Wireless communication device 120 or a proxy system generates and transfers IP address data sets characterizing IP access to wireless communication device 120 through IP access networks 101-103 (201). In parallel, wireless communication device 120 or a proxy system generates and transfers CDN identifiers indicating individual CDNs 110-119 that are active for wireless communication device 120 (202). Data processing system 150 receives the IP address data sets characterizing the IP access to wireless communication device 120 through IP access networks 101-103 (203). In parallel, data processing system 150 also receives the CDN identifiers indicating individual CDNs 110-119 that are active for wireless communication device 120 (204).

Data processing system 150 processes the IP address data sets and the CDN identifiers to identify a network address for one of access CDNs 116-119 and to identify a content-delivery interfaces 121-124 for use between the one access CDN and wireless communication device 120 (205). For example, data processing system 150 may identify LIPA interface 124 from CDN 119 to wireless communication device 120 and also identify a public IP address for CDN 119. In some examples, wireless communication device 120 transfers a prioritized list of active CDNs for system 150 to select from. Wireless communication device 120 may also select one desired CDN and data processing system 150 may then use or override the selection.

Data processing system 150 transfers network data indicating wireless communication device 120, the network address for the access CDN, and the content-delivery interface between the access CDN and wireless communication device 120 (206). Data processing system 150 may specify the content-delivery interface by system ID, type, node ID, IP footprint, and the like. Data processing system 150 transfers the network data to active core CDNs 110-115 for wireless communication device 120. Advantageously, the active core CDNs may use the network data for content pre-positioning, re-direction, caching, and delivery through the identified access CDN and content-delivery interface to wireless communication device 120 (207).

Referring to FIG. 3, communication system 100 is further described. Wireless communications device 120 transmits IP address data sets to access interface 151. The IP address data sets typically indicate the IP address allocations and IP address translations that IP access networks use for wireless communication device 120. For example, IP access network 102 may use an IP version 6 (IPv6) mobility protocol to allocate an IPv6 prefix to wireless communication device for translation with its public IPv4 Internet traffic. IP access network 103 may use a Dynamic Host Control Protocol (DHCP) to allocate an IPv6 address to wireless communication device 120 and then translate that address a few times before ingress/egress with a public data network like the Internet.

Wireless communications device 120 transmits an access CDN ID for access CDN 117 to access interface 151 indicating that device 120 is currently active on CDN 117. This data transfer typically indicates IP address information (allocations and translations) that IP access network 102 uses for CDN 117. This IP address data for CDN 117 may also be discovered and transferred along with the IP address data sets above. In some examples, the CDN ID comprises its network address, network prefix, or public IP footprint. In some examples, wireless communication device 120 supplies multiple active CDN IDs in a prioritized order for confirmation and possible override by data processing system 150. In some examples, wireless communication device 120 also identifies its active core CDNs, such as core CDN 110.

Data processing system 150 identifies a network address for at least one of the active access CDNs 116-119. This may comprise identifying the network address in the CDN ID or it may comprise processing the CDN ID, IP addressing information, network topology data, and other information to identify a network address for one of the access CDNs like CDN 117. In some examples, data processing system 150 identifies a network address for at least one of the active core CDNs 110-115 for wireless communication device 120.

Data processing system 150 identifies content-delivery interface 122 from access CDN 117 to wireless communication device 120. In some cases, access CDN 117 is selected due to one or more of its available content-delivery interfaces. Exemplary content-delivery interfaces to select from may include: RTP, RTSP, RTCP, LTE, eMBMS, LTE LIPA, FLUTE, FLUTE/eMBMS, Ethernet, Wifi, and uPnP. Multiple content-delivery interfaces are typically available between wireless communication device 120 and access CDNs 116-119. In some examples, multiple content-delivery interfaces are available between wireless communication device 120 and a single access CDN like CDN 117.

Data processing system 150 transfers network data to core CDN 110 indicating the network address for access CDN 117 and indicating the type of content-delivery interface 122 from CDN 117 to wireless communication device 120. Typically, data processing system 150 selects core CDN 110 based on the active CDN information from wireless communication device 120. For example, the network data may provide public IP addresses for CDN 117 and wireless communication device 120 and indicate that RTSP/RTCP over LTE LIPA is the content delivery interface between access CDN 117 and device 120.

Core CDN 110 may use the network data for various purposes. In this example, core CDN 110 uses the network data to transfer both pre-positioning data and media content to access CDN 117 for device 120. Core CDN 110 also uses the network data to transfer pre-positioning data to wireless communication device 120. Responsive to the pre-positioning information, wireless communication device 120 transfers a content request to access CDN 117, and CDN 117 transfers the requested content to wireless communication device 120 over the specified content-delivery interface—and additional CDNI messaging may be used to effect this transfer. Responsive to the pre-positioning information, wireless communication device 120 also transfers a content request to core CDN 110, and CDN 110 transfers a re-direct for the requested content to wireless communication device 120. Wireless communication device 120 processes the re-direct request to transfer a re-directed content request to access CDN 117, and CDN 117 transfers the requested content to wireless communication device 120 over the specified content-delivery interface—and additional CDNI messaging may be used to effect this transfer. The content transfers may use Forward Error Correction (FEC) such as Raptor coding. The content transfers may use a congestion control mechanism, such as Explicit Congestion Notification (ECN).

Figure 4:
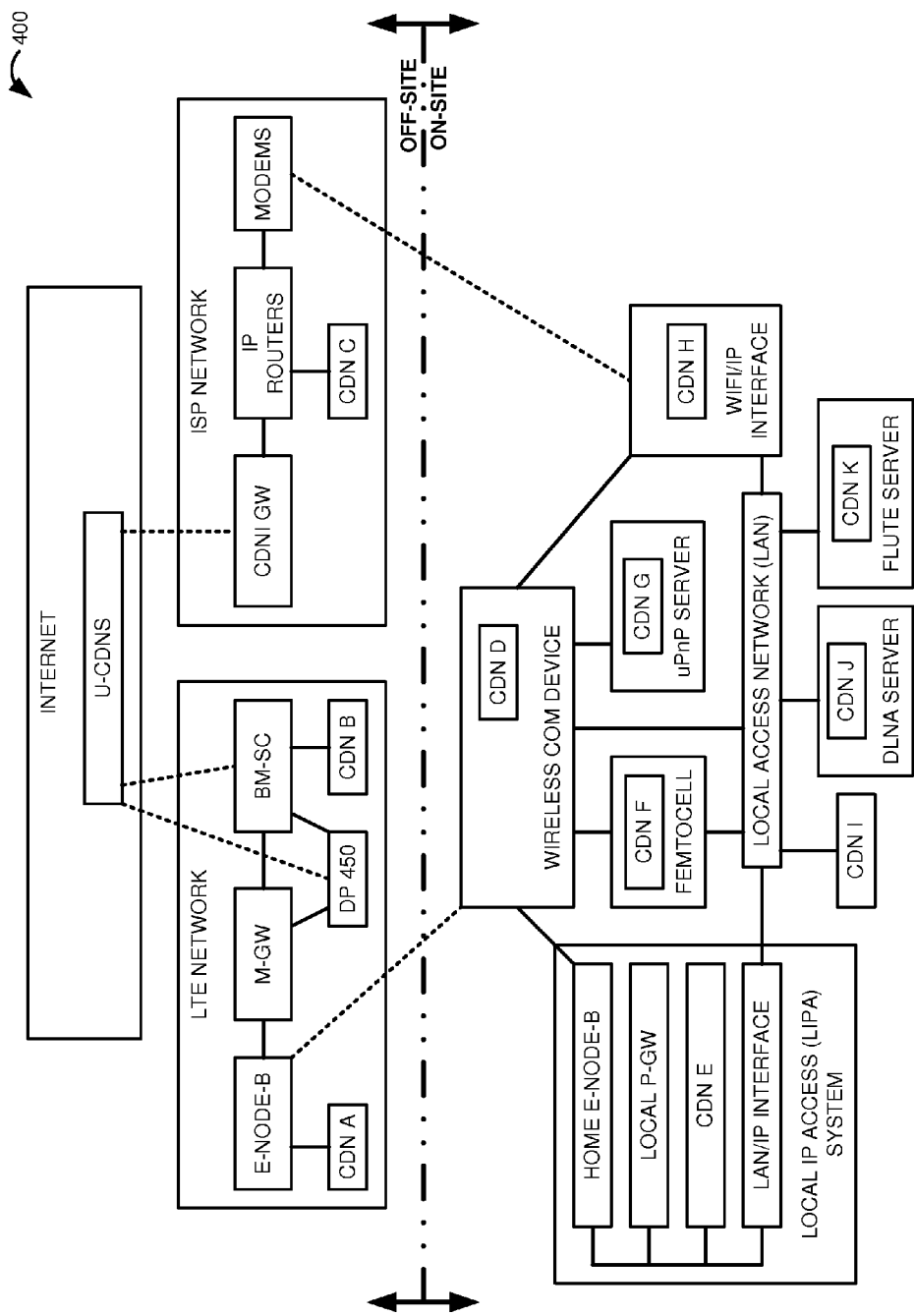
FIGS. 4-5 illustrate an LTE communication environment to distribute media content to a wireless communication device.
Figure 5:
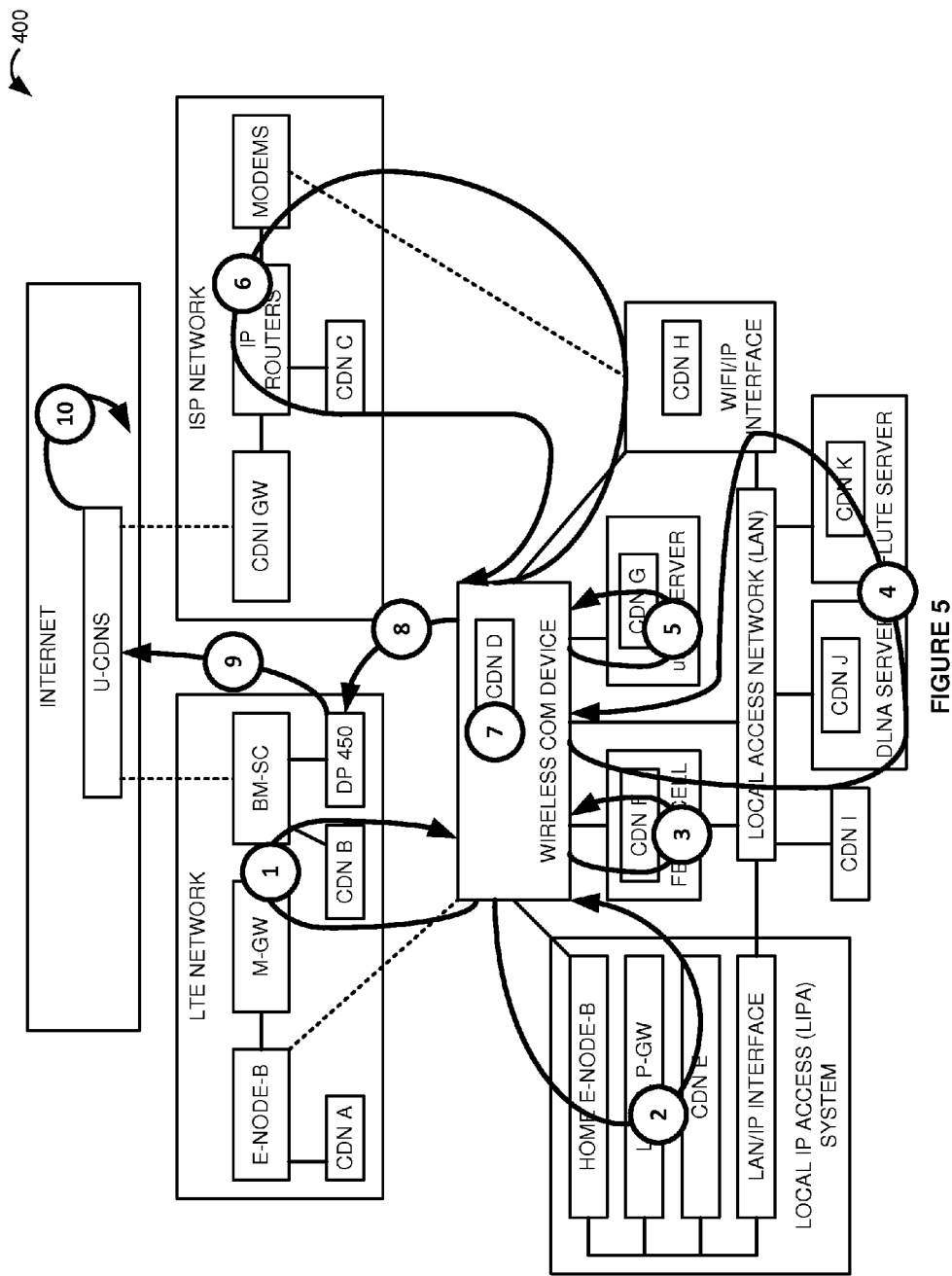

FIGS. 4-5 illustrate communication system 400 to distribute media content to a wireless communication device in an LTE communication environment. Communication system 400 is an example of communication system 100, although system 100 may have alternative configurations and operations. Referring to FIG. 4, the LTE environment is separated into an on-site portion (like a residence, business, or school) and an off-site portion (including access networks, CDNs, the Internet, and the like). Off-site, communication system 400 comprises a Long Term Evolution (LTE) network, Internet Service Provider (ISP) network, and an Internet. The Internet comprises numerous upstream Content Delivery Networks (uCDNs). The LTE network comprises an eNodeB, Multimedia Broadcast Multicast System (MBMS) Gateway (M-GW), Broadcast Multicast Service Center (BM-SC), CDN A, CDN B and Data Processor (DP) 450. The ISP network comprises IP modems, routers, CDNI Gateway (GW), and CDN C. The uCDNs on the Internet communicate with the BM-SC in the LTE network and with the CDNI GW in the ISP network.

On-site, communication system 400 comprises a wireless communication device, LTE Local IP Access (LIPA) system, Local Area Network (LAN), femtocell, uPnP server, Wifi/IP interface, CDN I, DLNA server, and FLUTE server. The LIPA system includes a Home eNodeB (HeNB), local service/Packet Gateway (P-GW), CDN E, and LAN/IP interface. The wireless communication device is coupled to the LIPA HeNB, LTE network eNodeB, femtocell, uPnP server, and Wifi/IP interface. The LAN interconnects the LTE Local IP Access (LIPA) system, femtocell, wireless communication device, Wifi/IP interface, CDN I, DLNA server, and FLUTE server. The Wifi/IP interface is coupled to one or more modems in the ISP network.

CDNs A-K are located in various elements of communication system 400 as follows: CDN A & B in the LTE network, CDN C in the ISP network, CDN D in the wireless communication device, CDN E in the LIPA system, CDN F in the femtocell, CDN G in the uPnP server, CDN H in the Wifi/IP interface, CDN I on the LAN, CDN K in the DLNA server. CDNs A-K host media content and have differing levels of CDNI capability. Advantageously, communication system 400 generates network data allowing the uCDNs to use various individual access CDNs A-K to transfer media content to the wireless communication device.

Referring to FIG. 5, the operations of communication system 400 are described. In a first operation, the wireless communication device discovers the IP address allocations and translations used for it within the LTE network. The wireless communication device also determines that CDNs A and B are active and available to support the wireless communication device at their given level of CDNI capability.

In a second operation, the wireless communication device discovers the IP address allocations and translations used for it within the LIPA system. The wireless communication device determines that CDN E is active and available to support the wireless communication device at its level of CDNI capability.

In a third operation, the wireless communication device discovers the IP address allocations and translations used for it within the femtocell system. The wireless communication device determines that CDN F is active and available to support the wireless communication device at its level of CDNI capability.

In a fourth operation, the wireless communication device discovers the IP address allocations and translations used for it within the LAN and the Wifi/IP interface. The wireless communication device determines that CDNs H, I, J, and K are active and available to support the wireless communication device at their given level of CDNI capability.

In a fifth operation, the wireless communication device discovers the IP address (if any) and CDN G capabilities for the uPnP server.

In a sixth operation, the wireless communication device discovers the IP address allocations and translations used for it within the ISP network. The wireless communication device also determines that CDN C is active and available to support the wireless communication device at its level of CDNI capability.

In a seventh operation, the wireless communication device discovers its own IP address translations (if any) and CDN D CDNI capabilities. In some examples, the wireless communication device and CDN D serve media content to user devices that are tethered to the wireless device under the control of DP 450.

In an eighth operation, the wireless communication device transfers content-delivery data to data processing system 450. The content delivery data indicates the IP addressing for the wireless communication device by the LTE network, ISP network, LIPA system, LAN, and femtocell. The content delivery data indicates a prioritized list of CDNs A-K including their active/inactive status, CDNI capabilities, content-delivery interfaces, network addresses, and content inventories. The content delivery data also indicates a prioritized list of the uCDNs on the Internet that are active for the wireless communication device and should receive its network data or specified portions of its network data. The content delivery data may indicate other metrics, such as an International Mobile Equipment Identifier (IMEI), International Mobile Subscriber Identifier (IMSI), Global Cell Identifier (GCI), location, and the like.

In a ninth operation, data processing system 450 processes the IP address data, CDN data, content inventories, and the like to select one or more of CDNs A-K for the wireless communication device. This selection could use various metrics to select a CDN including CDN status and ability, content-delivery interfaces, on-site content availability, and the like. Data processing system 450 also processes this data to identify the type content-delivery interface to use between the selected CDNs and the wireless communication device. For example, data processing system 450 may select CDN B and eMBMS as the content-delivery interface. Data processing system 450 may select CDN E and LTE LIPA as the content-delivery interface. Data processing system 450 may select CDN C and RTP as the content-delivery interface. Data processing system 450 may select CDN K and FLUTE as the content-delivery interface. Data processing system 450 may select DN J and Ethernet or Wifi as the content-delivery interface. Data processing system 450 transfers its network data to the specified uCDNs.

DP 450 may use various criteria and logic to select access CDNs. For example, DP 450 may process an LTE Access Point Name (APN) for the wireless communication device to identify an access CDN/content-delivery priority such as: 1) LIPA, 2) femtocell, 3) LTE network, 4) ISP network. DP 450 may also store a prioritized list of content-delivery interfaces for the various access CDNs. Alternatively, DP 450 may transfer a DNS SRV request for the wireless communication device to return a prioritized list of access CDNs and their content-delivery interfaces.

In a tenth operation, the uCDNs use the network data for pre-positioning, redirection, and the like. For example, a uCDN may transfer pre-positioning information for the wireless communication device to CDN E over the ISP network and LAN. In another example, the uCDN may transfer a re-direct request to the wireless communication device indicating the network address of CDN F for a given content request. In another example, the uCDN may distribute hot Uniform Resource Locators (URLs) to the wireless communication device from CDN B in eMBMS/FLUTE FDT communications to the wireless communication device. This URL transfer may occur in response to an eMBMS registration by the wireless communication device indicating CDN B.

In some examples, DP 450, an access CDN, and/or a uCDN may request a CDN transfer to eMBMS based on media content usage. For example, if CDNI usage logs indicate to a uCDN that a given media file or live program has extensive usage by wireless devices, then the uCDN may direct DP 450 to transfer the media content to the wireless devices over a wireless eMBMS broadcast or multicast. For example, the uCDN may direct DP 450 to hand-over content distribution of a live sporting event from multiple LIPA feeds over the ISP network to a wireless eMBMS content transfer.

Figure 6:
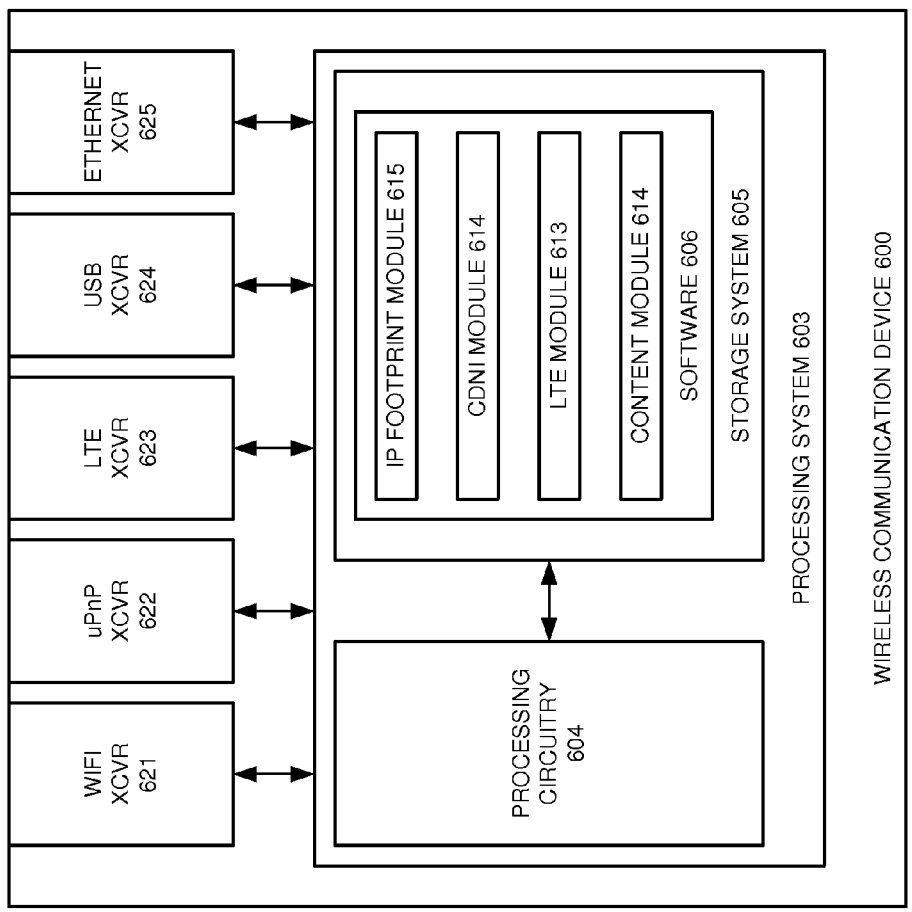
FIG. 6 illustrates a wireless communications device to obtain media content over multiple CDNs.

FIG. 6 illustrates wireless communications device 600 to obtain media content over multiple CDNs. Wireless communications device 600 is an example of wireless communication device 120 and the wireless communication device in system 400, although these devices may use alternative configurations and operations. Wireless communications device 600 comprises Wifi transceiver 621, uPnP transceiver 622, LTE transceiver 623, Universal Serial Bus (USB) transceiver 624, and Ethernet transceiver 625. Communication transceivers 621-625 comprise communication components, such as antennas, ports, amplifiers, filters, modulators, signal processors, and the like.

Wireless communications device 600 comprises processing system 603. Processing system 603 comprises processing circuitry 604 and storage system 605. Storage system 605 stores software 606. Software 606 includes software modules 611-615. Some conventional aspects of wireless communications device 600 are omitted for clarity, such as power supplies, enclosures, and the like. Wireless communications device 600 may be centralized or distributed and may include various virtualized components.

In processing system 603, processing circuitry 604 comprises circuit boards, integrated circuitry, and associated electronics. Storage system 605 comprises non-transitory, machine-readable, data storage media, such as flash drives, disc drives, memory circuitry, servers, and the like. Software 606 comprises machine-readable instructions that control the operation of processing circuitry 604 when executed. Software 606 includes software modules 611-614 and may also include operating systems, applications, data structures, virtual machines, utilities, databases, and the like. All or portions of software 606 may be externally stored on one or more storage media, such as flash drives, discs, servers, and the like.

When executed by processing circuitry 604, IP footprint module 611 directs circuitry 604 to discover the IP allocations and translations used for it and for its active CDNs in various IP networks. When executed by processing circuitry 604, CDNI module 612 directs circuitry 604 to discover active CDNs, their CDNI capabilities, network addresses, content inventories and the like. When executed by processing circuitry 604, LTE module 613 directs circuitry 604 to attach, register, and exchange data with LTE networks and eMBMS systems. When executed by processing circuitry 604, content module 614 directs circuitry 604 to gather request, receive, and present media content.

Figure 7:
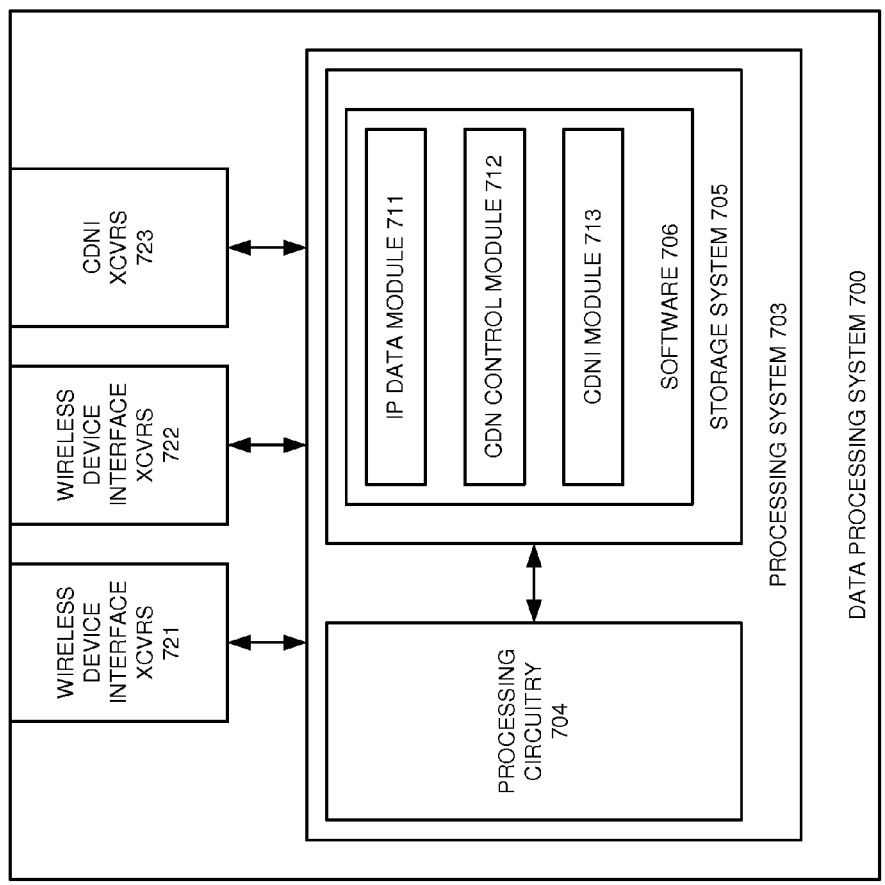
FIG. 7 illustrates a data processing system to facilitate the transfer of media content to wireless communication devices over multiple CDNs.

FIG. 7 illustrates data processing system 700 to facilitate the transfer of media content to wireless communication devices over multiple CDNs. Data processing system 700 is an example of data processing systems 150 and 350, although these systems may use alternative configurations and operations. Data processing system 700 comprises wireless device interface transceivers 721, LTE network transceivers 722, and CDNI transceivers 723. Transceivers 721-723 comprise communication components, such as ports, microprocessors, memory, software, and the like.

Data processing system 700 comprises processing system 703. Processing system 703 comprises processing circuitry 704 and storage system 705. Storage system 705 stores software 706. Software 706 includes software modules 711-712. Some conventional aspects of data processing system 700 are omitted for clarity, such as power supplies, enclosures, and the like. Data processing system 700 may be centralized or distributed and may include various virtualized components.

In processing system 703, processing circuitry 704 comprises circuit boards, integrated circuitry, and associated electronics. Storage system 705 comprises non-transitory, machine-readable, data storage media, such as flash drives, disc drives, memory circuitry, servers, and the like. Software 706 comprises machine-readable instructions that control the operation of processing circuitry 704 when executed. Software 706 includes software modules 711-713 and may also include operating systems, applications, data structures, virtual machines, utilities, databases, and the like. All or portions of software 706 be externally stored on one or more storage media, such as flash drives, discs, servers, and the like.

When executed by processing circuitry 704, IP data module 711 directs circuitry 704 to process IP address data from wireless devices to identify their public IP addresses for their uCDNs. When executed by processing circuitry 704, CDN control module 712 directs circuitry 704 to select CDNs and their content-delivery interfaces to wireless devices. When executed by processing circuitry 704, CDNI module 713 directs circuitry 704 to interact with uCDNs as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data processing system to facilitate content-delivery to a wireless communication device, the method comprising:

the wireless communication device wirelessly transferring multiple Internet Protocol (IP) address data sets characterizing IP access to the wireless communication device through multiple IP access networks;

the wireless communication device wirelessly transferring multiple downlink Content Delivery Network (dCDN) identifiers indicating active dCDNs for the wireless communication device on the multiple IP access networks;

a wireless communication network wirelessly receiving the multiple IP address data sets characterizing the IP access to the wireless communication device through the multiple IP access networks;

the wireless communication network wirelessly receiving the multiple dCDN identifiers indicating the active dCDNs for the wireless communication device on the multiple IP access networks;

the wireless communication network processing the multiple IP address data sets and the multiple dCDN identifiers to select one of the active dCDNs and identify a network address for the selected one of the active dCDNs and a content-delivery interface from the selected one of the active dCDNs to the wireless communication device; and the wireless communication network transferring network data for delivery to an uplink CDN (uCDN) indicating the wireless communication device, the network address to the selected one of the active dCDNs, and the content-delivery interface, wherein the content-delivery interface comprises at least one of a universal Plug and Play (uPnP), an enhanced Multimedia Broadcast Multicast Service (eMBMS), and a File Transfer over Unidirectional Transport (FLUTE).

2. The method of claim 1 wherein the selected one of the active dCDNs comprises a portion of a Long Term Evolution (LTE) Local IP Access (LIPA) system.

3. The method of claim 1 wherein the selected one of the active dCDNs comprises a Digital Living Network Alliance (DLNA) server.

4. The method of claim 1 wherein the wireless communication device and the selected one of the active dCDNs communicate over a Local Area Network (LAN).

5. The method of claim 1 wherein the selected one of the active dCDNs comprises a portion of a Long Term Evolution (LTE) wireless base station system.

6. The method of claim 1 wherein the content-delivery interface comprises the enhanced Multimedia Broadcast Multicast Service (eMBMS).

7. The method of claim 1 wherein the selected one of the active dCDNs comprises a File Transfer over Unidirectional Transport (FLUTE) server.

8. A data processing system to facilitate content-delivery to a wireless communication device, the data processing system comprising:

the wireless communication device configured to wirelessly transfer multiple Internet Protocol (IP) address data sets characterizing IP access to the wireless communication device through multiple IP access networks and to wirelessly transfer multiple downlink Content Delivery Network (dCDN) identifiers indicating active dCDNs for the wireless communication device on the multiple IP access networks; and a wireless communication network configured to wirelessly receive the multiple IP address data sets characterizing the IP access to the wireless communication device through the multiple IP access networks, wirelessly receive the multiple dCDN identifiers indicating the active dCDNs for the wireless communication device on the multiple IP access networks, process the multiple IP address data sets and the multiple dCDN identifiers to select one of the active dCDNs and identify a network address for the selected one of the active dCDNs and a content-delivery interface from the selected one of the active dCDNs to the wireless communication device, and transfer network data for delivery to an uplink CDN (uCDN) indicating the wireless communication device, the network address to the selected one of the active dCDNs, and the content-delivery interface, wherein the content-delivery interface comprises at least one of a universal Plug and Play (uPnP), an enhanced Multimedia Broadcast Multicast Service (eMBMS), and a File Transfer over Unidirectional Transport (FLUTE).

9. The data processing system of claim 8 wherein the selected one of the active dCDNs comprises a portion of a Long Term Evolution (LTE) Local IP Access (LIPA) system.

10. The data processing system of claim 8 wherein the selected one of the active dCDNs comprises a Digital Living Network Alliance (DLNA) server.

11. The data processing system of claim 8 wherein the wireless communication device and the selected one of the active dCDNs are configured to communicate over a Local Area Network (LAN).

12. The data processing system of claim 8 wherein the selected one of the active dCDNs comprises a portion of a Long Term Evolution (LTE) wireless base station system.

13. The data processing system of claim 8 wherein the content-delivery interface comprises the enhanced Multimedia Broadcast Multicast Service (eMBMS).

14. The data processing system of claim 8 wherein the selected one of the active dCDNs comprises a File Transfer over Unidirectional Transport (FLUTE) server.

* * * * *